United States Patent [19]

Gross

[11] Patent Number: 4,880,301
[45] Date of Patent: Nov. 14, 1989

[54] MOUNT FOR AN OPTICAL ELEMENT

[75] Inventor: Miroslav K. Gross, Rochester, N.Y.

[73] Assignee: Eastman Kodak Company, Rochester, N.Y.

[21] Appl. No.: 191,524

[22] Filed: May 9, 1988

[51] Int. Cl.⁴ ............................................. G02B 7/18
[52] U.S. Cl. .................................. 350/636; 350/634; 350/486; 350/171; 248/487
[58] Field of Search ............... 350/632, 633, 634, 636, 350/486, 287, 321, 252, 601, 171; 372/107; 248/476, 481–483, 486, 487

[56] References Cited

U.S. PATENT DOCUMENTS

| | | | |
|---|---|---|---|
| 3,024,049 | 3/1962 | Tranas | 248/482 |
| 3,642,353 | 2/1972 | Field | 350/634 |
| 4,037,942 | 7/1977 | Guyer | 372/107 |
| 4,165,921 | 8/1979 | Kirsch | 350/632 |
| 4,171,902 | 10/1979 | Imai et al. | 355/11 |
| 4,560,244 | 12/1985 | Ackerman | 350/486 |
| 4,563,058 | 1/1986 | Yardy | 350/633 |

FOREIGN PATENT DOCUMENTS

| | | | |
|---|---|---|---|
| 666502 | 6/1979 | U.S.S.R. | 350/632 |
| 723475 | 3/1980 | U.S.S.R. | 350/632 |
| 792200 | 12/1980 | U.S.S.R. | 350/321 |

Primary Examiner—Jon W. Henry
Attorney, Agent, or Firm—Donald D. Schaper

[57] ABSTRACT

A mount for an optical element is disclosed in which an optical element can be adjusted to a plurality of positions relative to an optical axis. The element is mounted in a holder which can be moved about a plurality of axes. In order to provide a mount which is capable of very fine adjustment, the optical element is mounted such that an operative surface is at a small angle to a plane perpendicular to the optical axis, and the optical element is rotated about the optical axis to provide the desired adjustment.

11 Claims, 4 Drawing Sheets

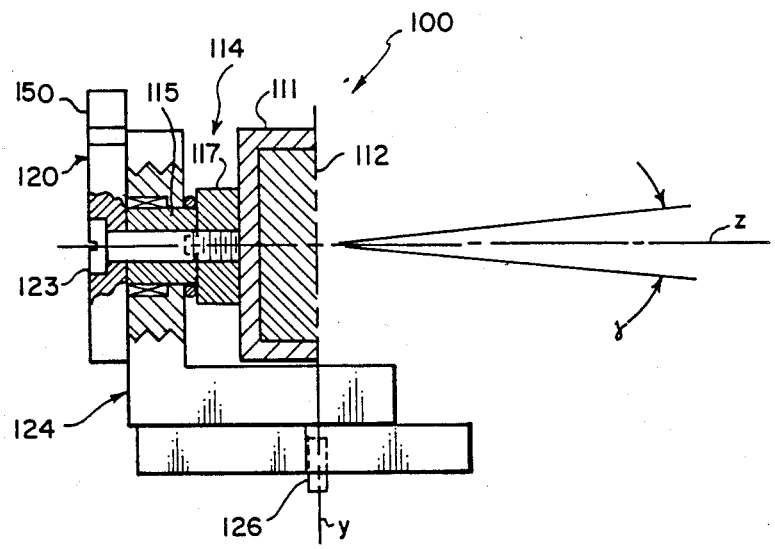
FIG. 7
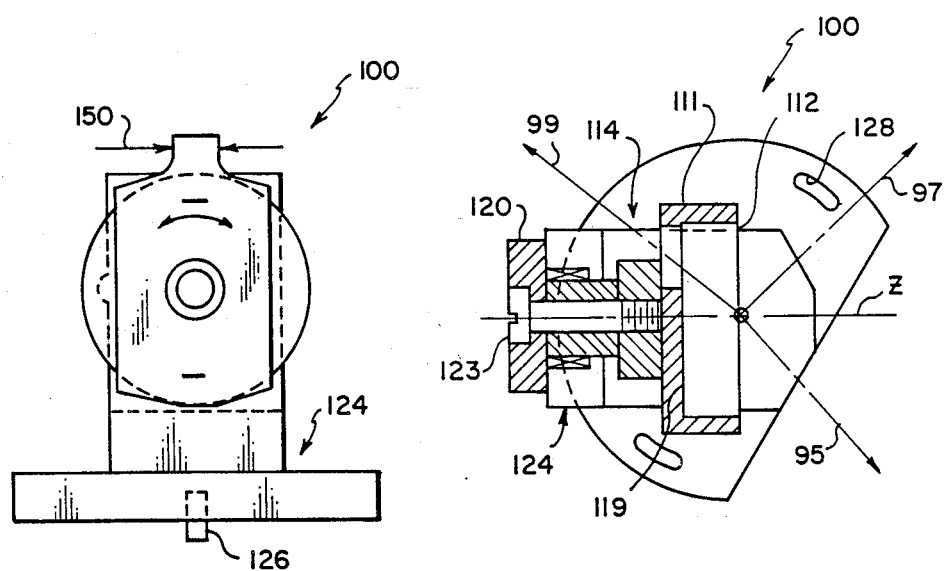
FIG. 8
FIG. 9

MOUNT FOR AN OPTICAL ELEMENT

CROSS REFERENCE TO RELATED APPLICATION

Reference is made to commonly-assigned U.S. application, Ser. No. 191,679, entitled Mount for an Optical Element, filed in the name of E. H. Wakefield, on even date herewith.

BACKGROUND OF THE INVENTION

1. Field of the Invention

The present invention relates to a mount for an optical element, and more particularly, to such a mount which can be adjusted to accurately position an optical element in optical apparatus.

2. State of the Prior Art

Optical elements must be very accurately positioned in certain types of apparatus such as apparatus using lasers as a light source. Mounts for the optical elements must be adjustable in order to position the element relative to a laser beam and to compensate for changes in the optical system during use of the apparatus. The elements must also be capable of withstanding vibration and shock without moving from an adjusted position, and thus, the mounts for the elements must include means for locking the optical elements in an adjusted position without inducing distortion or strain in the elements. One of the main problems in prior-art mounts for optical elements is that the mounts cannot be easily adjusted to a precise position. A further problem with known mounts is that they cannot be locked after adjustment without changing the adjusted position.

In U.S. Pat. No. 4,171,902, there is shown a mount for an optical element in which a mirror can be pivoted about a horizontal axis to effect adjustment of a beam in one direction and about a vertical axis to effect adjustment in a second direction. Each of the adjustments is made by means of a screw which is operative to pivot the mirror against a spring force which biases the mirror in one direction of rotation. A problem with this mount is that the use of springs to hold the mirror in place makes it very difficult to lock the element in an adjusted position. Another problem with the mount is that there is no provision for making very fine adjustments in the position of the optical element.

SUMMARY OF THE INVENTION

It is an object of the present invention to overcome the problems in the prior art noted above and to provide an improved mount for an optical element.

In accordance with one aspect of the present invention, there is provided a mount for an optical element, the mount being adjustable to position the element relative to an axis, the mount comprising: a holder for supporting the element along the axis such that an operative surface of the element extends transverse to the axis and forms an angle with a plane which is perpendicular to the axis; and a base for supporting the holder for rotation about the axis.

In one embodiment of the present invention, a mount for an optical element is adapted to support a circular mirror along an axis such that a surface of the mirror extends transverse to the axis and forms a small angle with a plane perpendicular to the axis. The angular position of the mirror can be adjusted in two rotational degrees of freedom. The circular mirror is supported in a holder which includes an adjustably-mounted cylindrical adapter fixed to the mirror. The holder is rotatably-supported in a base, and screws mounted in the base are operative against a portion of the holder to pivot the mirror about the axis to effect adjustment along one degree of freedom. The base is mounted for pivotal movement about a second axis perpendicular to the axis about which the mirror is pivoted to effect adjustment along the second degree of freedom.

A principal advantage of the present invention is that very fine adjustments can be made in the position of the optical element as a result of mounting an operative surface of the element at a small angle to a plane perpendicular to the optical axis. A further advantage of the invention is that the resolution, or fineness of adjustment, can be changed by changing an adapter which is attached to the optical element. Another advantage of the present invention is that the mount can be used with different types of optical elements.

Other features and advantages will become apparent with reference to the following Description of the Preferred Embodiments when read in light of the attached drawings.

BRIEF DESCRIPTION OF THE DRAWINGS

FIG. 7 is a side elevational view of a second embodiment of the present invention.

FIG. 8 is a rear elevational view of the embodiment shown in FIG. 7; and

FIG. 9 is a top plan view of the embodiment shown in FIG. 7.

DESCRIPTION OF THE PREFERRED EMBODIMENT

Figure 1:
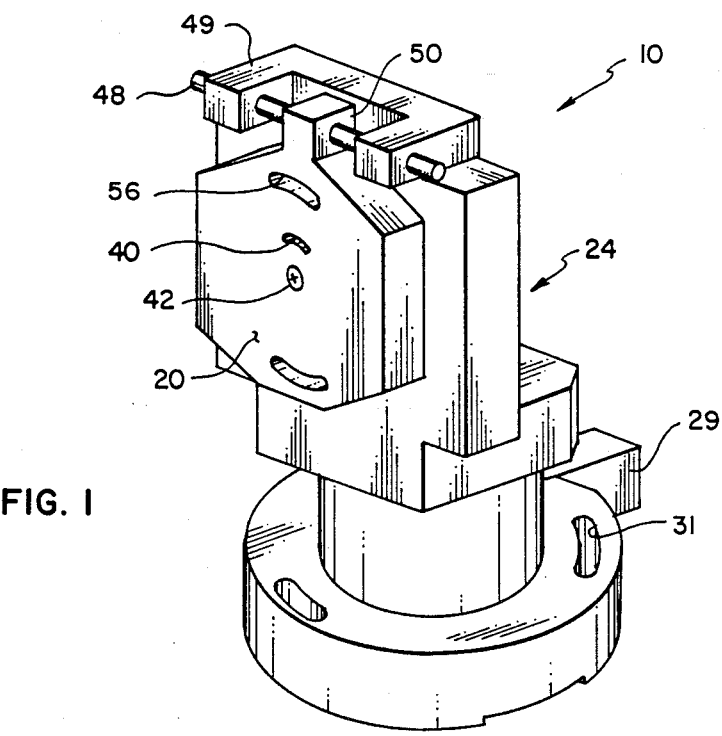
FIG. 1 is a perspective view of the mount of the present invention.

The mount of the present invention is useful in optical apparatus, such as a laser printer, where very high precision is required. References herein to terms such as "up," "down," "vertical," and "horizontal," refer to the present invention in the orientation shown in FIGS. 1 and 4.

Figure 4:
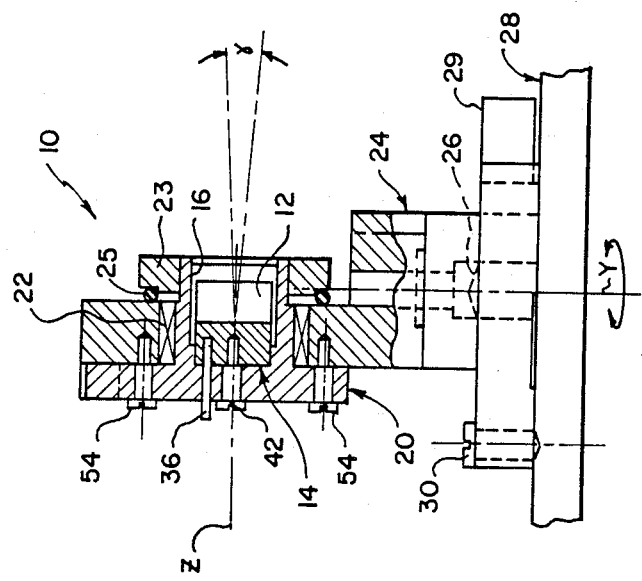
FIG. 4 is a side elevational view of the mount, with certain parts shown in section.
Figure 3:
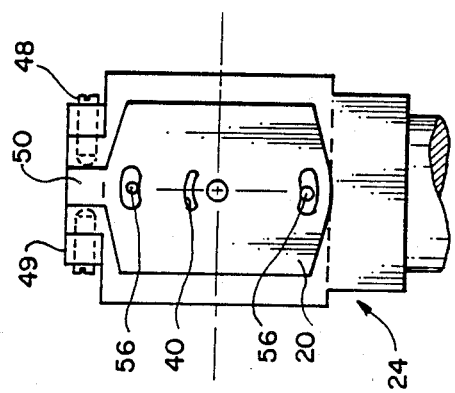
FIG. 3 is a rear elevational view of the mount, with certain parts omitted.

With reference to FIGS. 1-5, there is shown a mount 10 which is constructed in accordance with present invention. Mount 10 is adapted to support an optical element, for example, a cylindrical mirror 12, along an axis designated the Z axis. (See FIG. 4.) As will be discussed hereinafter, the position of mirror 12 can be adjusted to determine the position of a beam reflected from mirror 12. Mirror 12 is supported in a holder which includes a cylindrical adapter fixed to the mirror 12 by, for example, an adhesive. Adapter 14 and mirror 12 are received in a cavity 16 in a holder 20. Holder 20 is supported in a base 24 for pivotal movement about the Z axis. As shown in FIG. 4, holder 20 is mounted for pivotal movement in a bushing 22 secured in base 24. A retainer ring 23 is threaded on holder 20 and tightened against an O-ring 25 to retain holder 20 in base 24 and provide limited resistance against pivotal movement of the holder 20 relative to base 24.

Base 24 is pivotally supported on a pin 26 extending from a base plate 28 for adjustment about a Y axis (FIG. 4), and the base 24 is secured in an adjusted position by means of fasteners 30 which extend through slots 31 in base 24. It will be seen that adjustment of base 24 about the Y axis can be effected by screws 27 which are supported in a bracket (not shown) on plate 28 and bear against a lug 29 on base 24. Base plate 28 is adapted to be incorporated in optical apparatus (not shown).

Figure 2:
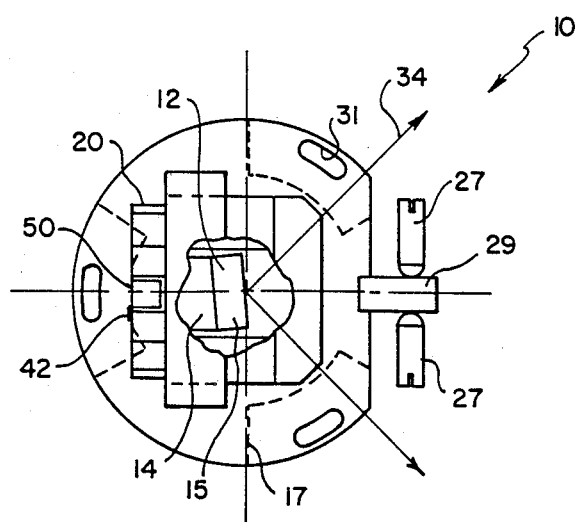
FIG. 2 is a top plan view, with parts broken away, of the mount.
Figure 5:
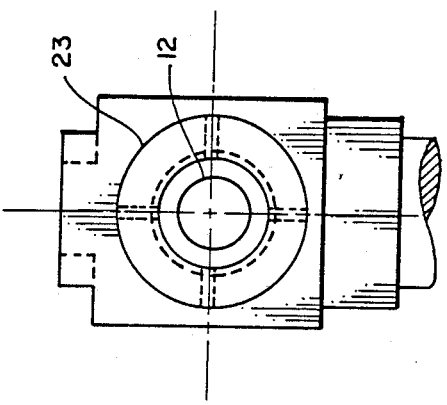
FIG. 5 is a front elevational view of the mount, with certain parts omitted.
Figure 6:
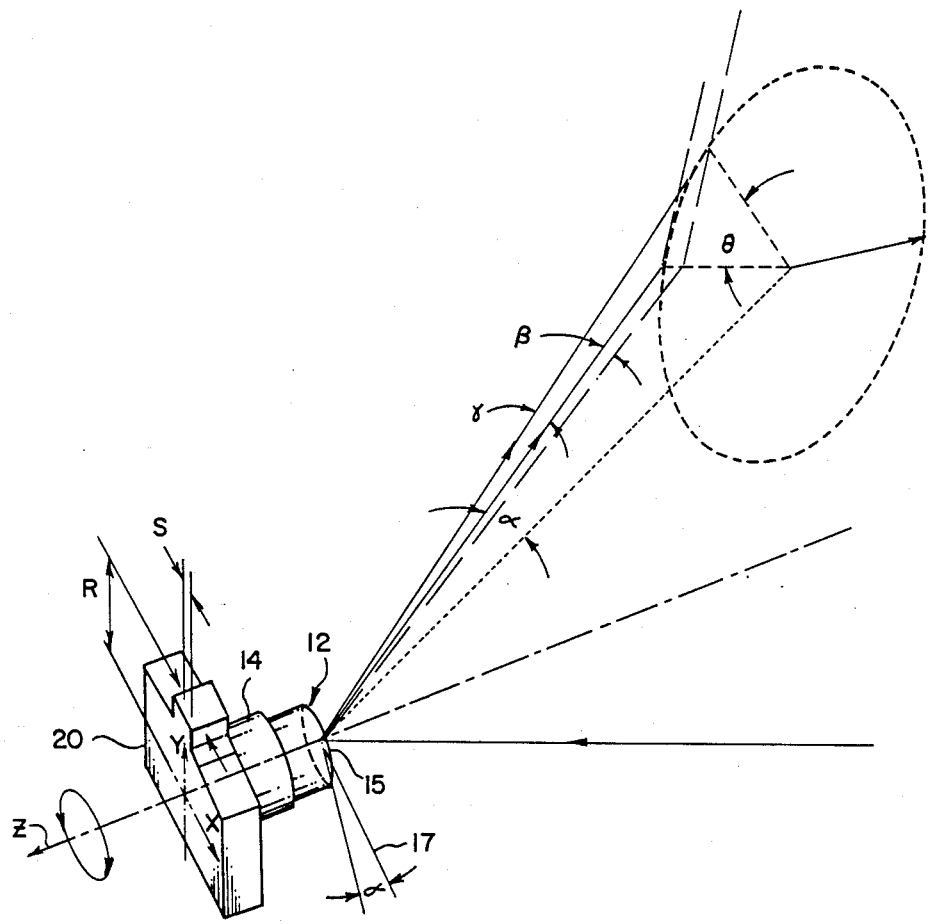
FIG. 6 is a diagram illustrating adjustment of the mount for a particular mirror angle.

Mirror 12 is supprted by adapter 14 at an angle relative to the z axis, as best shown in FIGS. 2 and 6. The cylindrical mirror 12 includes an operative surface 15 which makes an angle with a plane 17 which is perpendicular to the Z axis. The angle which surface 15 makes with plane 17 is designated $\alpha$ (see FIG. 6), and this angle can be a very small angle, for example one degree, when fine resolution is desired. A feature of the present invention is that the resolution of the mount 10 can be changed by using an adapter 14 which supports mirror 12 at a different angle, and thus, surface 15 will form a different angle with plane 17.

Mirror 12 is rotated to adjust the position of a reflected beam, for example beam 34 shown in FIG. 2. When adapter 14 and the mirror 12 thereon are inserted in holder 20, a pin 36 extending from adapter 14 is received in a slot 40 in holder 20. The adapter 14 is secured to holder 20 by means of a screw 42. A coarse adjustment of mirror 12 can be made by changing the angular position of adapter 14 within the limits of slot 40. A fine adjustment of mirror 12 can be made by means of screws 48 which are supported in a bracket 49 on base 24. Screws 48 are operative against an upstanding portion 50 on holder 20. To make an adjustment, one of the screws 48 is advanced while the other of the screws 48 is backed off. When mirror 12 is in a desired position, screws 54, which pass through slots 56 in holder 20, are threaded into base 24 to lock the holder in position.

With reference to FIG. 6, there is shown a diagram for use in calculating the resolution of the present invention. It can be shown, that for small angular movements of holder 20, that $$\gamma = 2\alpha\Theta \quad (1)$$

where $\gamma$ is the steering angle in the Y direction, $\Theta$ is the angle through which holder 20 is moved, and $\alpha$ is the angle which mirror 12 makes with plane 17, and that $$\beta = \frac{\Theta^2 \alpha}{4} \quad (2)$$

where $\beta$ is the angular component in the X direction.

Thus, in one illustrative example, if $\alpha$ is 1 degree (0.0175 radians), then according to equation (1)

$$\gamma = 2(0.0175)\Theta = 0.035\Theta$$

and according to equation (2)

$$\beta = 0.0044\Theta^2$$

If S is the displacement of holder 20, as shown in FIG. 6, and R is taken to be 1 inch, then $$\frac{\gamma}{S} = \frac{\gamma}{\Theta(R)} = \frac{0.035\Theta}{\Theta} \text{ radians/inch}$$

$$= 7.2 \text{ arc sec}/0.001 \text{ inch resolution}$$

For an S=0.010 inch, $\Theta = S/R = 0.010$ rad. and we find $\gamma = 0.035$ (0.010 rad.) = 72 arc sec $\beta = 0.0044 \Theta^2 = 0.09$ arc sec From the above equations, it will be seen that very high resolution is achieved and that the component in the X direction is negligible. The resolution of the present invention can be compared to a known prior-art mount (not shown) of a type in which the mirror is pivoted directly about an axis. In this case, for a mirror of a size comparable to mirror 12, the resolution would be:

$$= \frac{2 \text{ milliradians}}{0.001 \text{ inch}} = 400 \frac{\text{arc sec}}{0.001 \text{ inch}} \text{ resolution}$$

In FIGS. 7–9, there is shown a second embodiment of the present invention in the form of a mount 100 for a beam splitter 112. Beam splitter 112 is supported in a holder 120 which includes a cup-shaped element 111 and an adapter 114. Beam splitter 112 is fixed in element 111 by, for example, an adhesive, and element 111 is connected to adapter 114 which includes cylindrical elements 115 and 117. As best shown in FIG. 9, element 117 has a surface 119 which is at an angle to a plane perpendicular to a Z axis; this angle is for the same purpose as the angle alpha discussed above for the mount 10. Cup-shaped element 111 is fixed to element 117 of adapter 114 by fasteners (not shown), and as shown in FIG. 9, the beam splitter 112 is supported at the angle determined by the angle of surface 119 relative to the Z axis. Beam splitter 112 is adapted to receive an input beam 95 and to split the beam into output beams 97 and 99.

Adapter 114 is fixed to holder 120 by a screw 123. Holder 120 is pivotally moveable in a base 124 by means of screws (not shown) which bear against an upstanding portion 150 on holder 120. Base 124 includes a pin 126 which is adapted to be received in an operative device (not shown) such that the base can be pivoted about a Y axis, and the base can be secured in an adjusted position by means of fasteners (not shown) which are received in slots 128 in base 124. The adjustment of mount 100 is accomplished in the same manner as described above for mount 10.

The invention has been described in detail with particular reference to a preferred embodiment thereof, but it will be understood that variations and modifications can be effected within the spirit and scope of the invention.

I claim:

1. A mount for use with an optical element which is adapted to receive an input beam and to project an output beam therefrom, said mount being adjustable to position said output beam along a first line in the form of an arc and along a second line which forms an angle with said first line, said mount comprising:

an optical element having an optical surface thereon;
a holder for supporting said element along a first axis such that the optical surface of the element extends transverse to the axis and forms a very small angle with a plane which is perpendicular to the axis;

a base for supporting said holder for rotation about said axis, said base including means operative against said holder for rotating said holder to effect a fine angular adjustment of said beam along said first line; and means for supporting said holder for rotation about a second axis generally perpendicular to said first axis, said supporting means including adjusting means to effect adjustment of said beam along said second line.

2. A mount, as defined in claim 1, wherein said optical element is a mirror.

3. A mount, as defined in claim 2, wherein said holder includes an adapter fixed to said mirror, and said adapter has a surface thereon which forms said angle with said plane.

4. A mount, as defined in claim 3, wherein said adapter is removably mounted in said holder whereby the angle which said operative surface of the mirror makes with said plane can be changed by changing the adapter.

5. A mount, as defined in claim 3, wherein said adapter is pivotally mounted in said holder to provide a coarse angular adjustment of said mirror.

6. A mount, as defined in claim 1, wherein said mount includes means for locking said holder in an adjusted position.

7. A mount, as defined in claim 1, wherein said means for supporting said holder for rotation includes a pivotal support for said base.

8. A mount, as defined in claim 1, wherein said optical element is a beam splitter.

9. A mount, as defined in claim 8, wherein said holder includes a cylindrical element for receiving said beam splitter, and said cylindrical element has an opening therein for the passage of a beam from said beam splitter.

10. A mount, as defined in claim 9, wherein said cylindrical element is fixed to an adapter, and said adapter has a surface thereon which is disposed at said angle to said plane.

11. A mount, as defined in claims 1 or 10, wherein said angle is about 1 degree.

* * * * *

UNITED STATES PATENT AND TRADEMARK OFFICE
CERTIFICATE OF CORRECTION

PATENT NO. : 4,880,301
DATED : November 14, 1989
INVENTOR(S) : Miroslav K. Gross It is certified that error appears in the above-identified patent and that said Letters Patent is hereby corrected as shown below:

On the title page at INID code [75], "Miroslay" should be --Miroslav--.

Signed and Sealed this

Twenty-ninth Day of January, 1991

Attest:

HARRY F. MANBECK, JR.

*Attesting Officer*     *Commissioner of Patents and Trademarks*